(12) United States Patent
Corpelet

(10) Patent No.: US 7,493,864 B2
(45) Date of Patent: Feb. 24, 2009

(54) CARRIAGE AND GANTRY COMPRISING SUCH A CARRIAGE

(75) Inventor: Jean-Michel Corpelet, Belfort (FR)

(73) Assignee: Cinetic Linking, Hericourt (FR)

( * ) Notice: Subject to any disclaimer, the term of this patent is extended or adjusted under 35 U.S.C. 154(b) by 243 days.

(21) Appl. No.: 11/412,719

(22) Filed: Apr. 27, 2006

(65) Prior Publication Data

US 2006/0248841 A1    Nov. 9, 2006

Related U.S. Application Data

(63) Continuation of application No. PCT/FR2004/002585, filed on Oct. 12, 2004.

(30) Foreign Application Priority Data

Oct. 29, 2003  (FR) ................................. 03 50744

(51) Int. Cl.
*B66C 17/00* (2006.01)
(52) U.S. Cl. ................. 105/163.1; 104/89; 212/312; 105/163.2
(58) Field of Classification Search .............. 105/163.1, 105/163.2, 169, 170, 165, 171, 148; 104/89, 104/91, 92, 111; 212/316, 324, 313, 312, 212/315, 224, 225, 71; 52/651.05
See application file for complete search history.

(56) References Cited

U.S. PATENT DOCUMENTS 1,752,026 A * 3/1930 Phillips .................... 105/163.1

FOREIGN PATENT DOCUMENTS

| DE | 31 29 446 | 7/1982 |
|----|-----------|--------|
| DE | 38 04 572 | 8/1989 |
| FR | 428137    | 7/1967 |
| GB | 783147    | 9/1957 |
| GB | 1151941   | 5/1969 |

\* cited by examiner

*Primary Examiner*—Mark T Le
(74) *Attorney, Agent, or Firm*—Harness, Dickey & Pierce, P.L.C.

(57) ABSTRACT

A carriage is intended to be disposed transversely between essentially-parallel lateral girders. The carriage comprises stirrups that are disposed at the lateral ends and which each cooperate with a lateral girder in order to enable the movement of the carriage along the longitudinal axis (x) of the lateral girders; a central girder which is placed between the stirrups; first connectors which are provided between a first lateral end of the central girder and the first stirrup, and second connectors which are provided between a second lateral end of the central girder and the second stirrup. The aforementioned first and second connectors are arranged such as to enable the movement of one stirrup in relation to the other with six degrees of freedom and a limited amplitude.

24 Claims, 4 Drawing Sheets

CARRIAGE AND GANTRY COMPRISING SUCH A CARRIAGE

CROSS REFERENCE TO RELATED APPLICATIONS

This application is a continuation of International PCT Application Serial No. PCT/FR2004/002585, filed Oct. 12, 2004, claiming priority to French Application Serial No. FR 0350744, filed Oct. 29, 2003, both of which are incorporated by reference herein.

BACKGROUND AND SUMMARY

The invention concerns a carriage intended to be placed transversely between two lateral girders substantially parallel to each other, the carriage being arranged so as to be able to be moved in a longitudinal direction parallel to the girders. The invention also concerns a gantry comprising two lateral girders substantially parallel to each other, as well as such a carriage.

Such carriages and gantries are used in factories, warehouses, etc. for handling objects, for example between various machining and/or storage stations. Generally the carriage comprises on the one hand a stirrup at each of its lateral end parts, the stirrups being intended to cooperate with the lateral girders of the gantry, and on the other hand a movable central girder placed between the stirrups and fixed to these, the girder being able to carry various tools or members for gripping objects. One or more motors enable the carriage to move longitudinally.

According to a first embodiment, a single central motor is provided on the carriage, provided with two lateral transmission shafts and pinions, in order to allow the driving of the carriage along the lateral girders. However, this solution is technically difficult to implement and may prove to be costly.

According to a second embodiment, two separate motors each drive one of the two stirrups of the carriage. Means of synchronising the two motors must then be provided, which gives rise to not insignificant additional cost and requires increased maintenance of the installations. In addition, despite these synchronisation means, there remain risks that the stirrups may not be moved strictly simultaneously and at the same speed. As a result the carriage may not remain perfectly transverse and risks being locked aslant between the lateral girders. This may occur even if the offset between the positions of the two stirrups is only a few millimeters.

In addition, having regard to the imperfect synchronisation of the two stirrups, such gantries do not allow movement of the carriage with the required precision, around one millimetre. Moreover, whatever the method of driving the stirrups and its performance, there exists another cause that may result in jamming of the carriage or impair the precision of the gantry. It is a case of lack of parallelism between the lateral girders. This may be due to the actual manufacture of the girders, where it is difficult to guarantee straightness because of their great length, around 20 meters for example. This defect may also stem from the deformation of the girders over time, after several months or several years of use of the gantry.

The invention aims to resolve the problems posed by the prior art by proposing an economical carriage and gantry guaranteeing excellent precision of movement of the carriage without any risk of jamming between the lateral girders, despite the non-parallelism of the lateral girders or imperfect synchronisation of the movement of the two stirrups. To this end, and according to a first aspect, the invention concerns a carriage intended to be placed substantially transversely between first and second lateral girders substantially parallel to each other, the carriage comprising:

a stirrup at each of its lateral end parts, a first stirrup being able to cooperate with the first lateral girder and a second stirrup being able to cooperate with the second lateral girder so as to allow the movement of the carriage in a longitudinal direction substantially parallel to the lateral girders;

a central girder placed between the stirrups;

a first connection means arranged between a first lateral end of the central girder and the first stirrup and second connection means arranged between a second lateral end of the central girder and the second stirrup, the connection means being arranged to allow the movement of one stirrup with respect to the other, according to six degrees of freedom, with limited amplitude.

Because the central girder is not being fixed to the stirrups, the stirrups can move with respect to each other, causing a deformation of the carriage (movement of the central girder with respect to the stirrups). The means of connection between the lateral ends of the central girder and the stirrups makes it possible to accommodate and compensate for any errors in synchronisation of the motors or deformations of the lateral girders. The movement of the central girder with respect to the stirrups thus makes it possible to obtain more flexibility and prevent locking of the carriage, despite the constant movement of one stirrup with respect to the other.

According to the invention, the first connection means can comprise a swivel connection and the second connection means a vertical support and transverse sliding means, the support and the transverse sliding means being arranged so as to allow the rotation movement of the central girder with respect to the first stirrup about longitudinal, transverse and vertical axes with limited amplitude. According to other characteristics the transverse sliding means can include means of limiting the amplitude of the rotation of the central girder with respect to the first stirrup about longitudinal, transverse and vertical axes.

According to one possible embodiment, the first connection means also comprise transverse sliding means situated at a distance from the swivel connection, the transverse sliding means being arranged so as to allow the rotation movement of the central girder with respect to the first stirrup about longitudinal, transverse and vertical axes with limited amplitude. For example, at least one of the transverse sliding means comprises:

on the one hand a piece having a U shape, the arms of which are situated in a substantially horizontal plane and directed transversely towards the central girder, the ends of the arms being fixed rigidly to a stirrup of the carriage;

on the other hand a rod fixed rigidly to the central girder and extending orthogonally to the U-shaped piece, the rod being arranged so as to be inserted in the space formed between the arms of the U-shaped piece with clearance so as to allow the transverse sliding of the central girder with respect to the end part of the carriage and to allow the rotation of the central girder with respect to the first stirrup about longitudinal, transverse and vertical axes according to a certain amplitude, by virtue of the swivel connection.

The second stirrup can comprise two vertically aligned U-shaped pieces situated at a distance from each other, the central girder being provided with two aligned vertical rods arranged so as to each to be inserted in one of the U-shaped pieces. For example, the first stirrup comprises a concave housing, and a convex piece with a shape complementary to that of the housing is rigidly fixed to the central girder so as to be able to cooperate with the housing in order to form the swivel connection.

According to one possible embodiment, the first stirrup comprises on the one hand a concave housing with a substantially vertical axis and on the other hand a U-shaped piece, and a central girder is provided with a vertical rod arranged so as to be inserted in the U-shaped piece so as to be placed so as to be substantially aligned with the axis of the concave housing. For example, a first intermediate piece is rigidly fixed to each of the two stirrups and a second intermediate piece is rigidly fixed to each of the lateral ends of the central girder, the means of connection between the girder and the stirrups being carried by the intermediate pieces.

According to a second aspect, the invention concerns a gantry comprising first and second substantially parallel lateral girders and a carriage as previously described, the carriage being placed substantially transversely between the lateral girders, and comprising a stirrup at each of its end parts, a first stirrup being able to cooperate with the first lateral girder and a second stirrup being able to cooperate with the second lateral girder so as to allow the movement of the carriage in a longitudinal direction substantially parallel to the lateral girders.

BRIEF DESCRIPTION OF THE DRAWINGS

The other characteristics of the invention result from the following description of embodiments, a description given with reference to the accompanying figures, in which.

DETAILED DESCRIPTION

Figure 1:
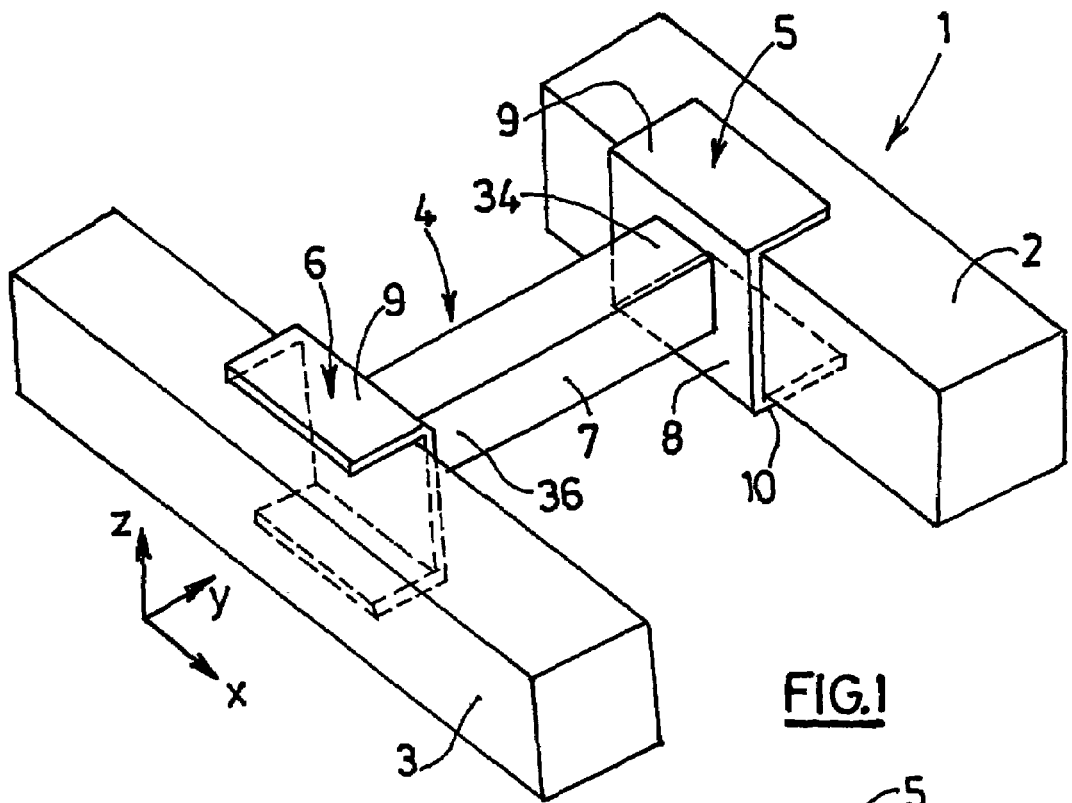
FIG. 1 is a schematic view in perspective of a gantry according to the invention, the connection means not having been shown.
Figure 2:
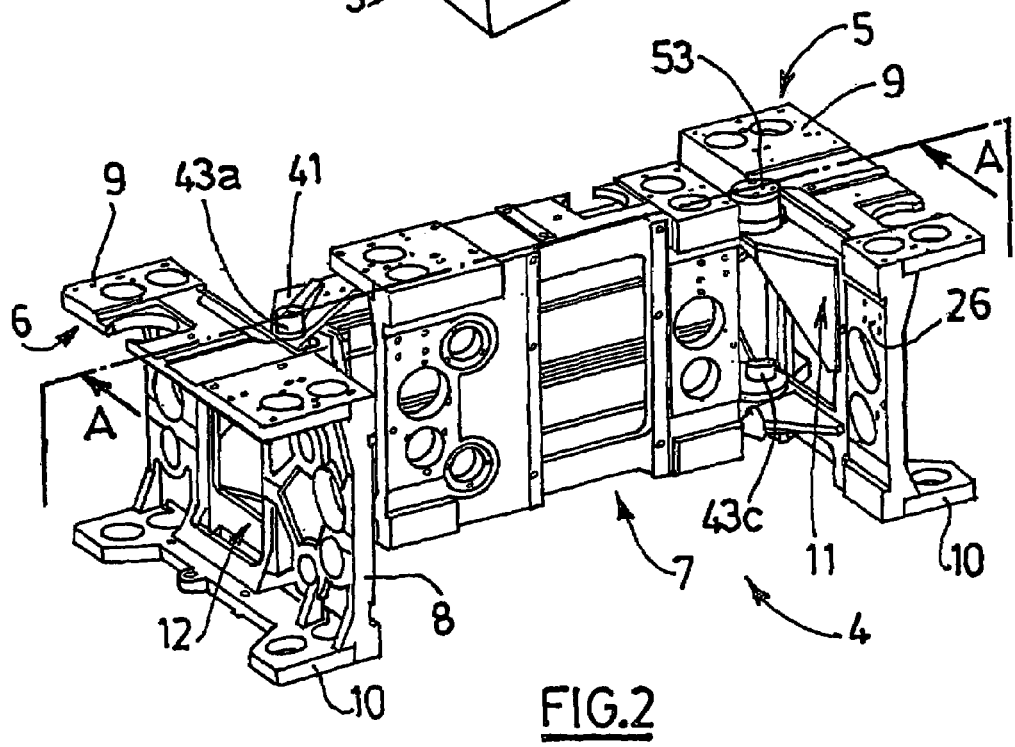
FIG. 2 is a perspective view of a carriage according to the invention.

Reference is made first of all to FIG. 1, which depicts a quadratic gantry 1 comprising first and second lateral girders 2, 3 substantially parallel to each other. The girders can have a length attaining 20 to 30 m, and be spaced apart by 5 to 10 m for example. The direction x of the lateral girders 2, 3 is said to be longitudinal, and the orthogonal direction y situated in the plane of the girders is said to be transverse. A third direction z, orthogonal to the other two, is also defined. The direction z is said to be vertical. However, this term is employed only for the purpose of simplification of the description, since the plane formed by the lateral girders 2, 3 may be not horizontal but inclined. A location close to the longitudinal axis situated halfway between the two lateral girders 2, 3 is said to be "internal", in contradistinction to a location at a distance from this axis, said to be "external". The terms "top", "bottom", "above", "below", "high", "low" will be employed with reference to the direction z. The terms "front" and "rear" will be employed with reference to the direction x, when it is considered that the carriage is moving in the direction of the arrow x in FIG. 1. Naturally this is aimed only at simplifying the description, and the carriage can also move in the opposite direction.

The gantry 1 also comprises a carriage 4 placed substantially transversely between the lateral girders 2, 3. The carriage 4 itself comprises a stirrup at each of its lateral end parts. A first stirrup 5 is able to cooperate with the first lateral girder 2 and a second stirrup 6 is able to cooperate with a second lateral girder 3, so as to allow the movement of the carriage in the direction x.

The carriage 4 also comprises a central girder 7, placed between the stirrups 5, 6 and connected to these by connection means which will be described subsequently. The central girder 7 is not rigidly fixed to the stirrups 5, 6. The carriage 4 is moved longitudinally by virtue of one or more motors, not shown. The motor or motors can be on board and provide the movement of the carriage by a system of pinions cooperating with a rack provided on the lateral girders. According to another possible embodiment, the motor or motors can be fixed with respect to the building in which the gantry 1 is situated and drive the carriage via a system of chains or belts. In the case where two motors are provided, means provide their synchronisation.

Now the carriage 4 and the connection means arranged between the central girder 7 and the stirrups 5, 6 are described more particularly. In the embodiment depicted, the stirrups 5, 6 are identical. A stirrup 5, 6 has the shape of a U comprising a vertical wall 8 and two horizontal walls 9, 10 extending transversely from the vertical wall 8 towards the outside— that is to say towards the lateral girder 2, 3 with which the stirrup 5, 6 in question cooperates. The stirrup 5, 6 is thus able to be placed around a lateral girder 2, 3 and to slide longitudinally along it.

Figure 4A:
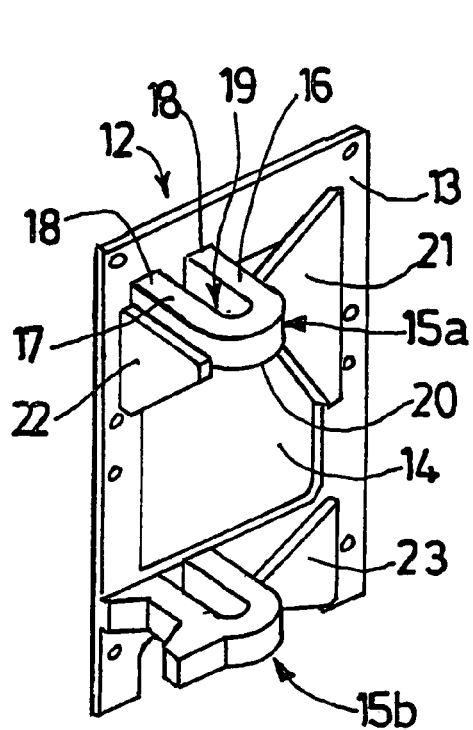
FIGS. 4a and 4b depict intermediate pieces intended to be rigidly fixed to the stirrups of the carriage.

An intermediate piece is rigidly fixed to the vertical wall 8 of each stirrup 5, 6, on the inside (opposite to the horizontal walls 9, 10). The first stirrup 5 carries the intermediate piece 11 of FIG. 4b, the second stirrup 6 carrying a different intermediate piece 12, depicted in FIG. 4a. The intermediate piece 12 depicted in FIG. 4a is described first of all.

The intermediate piece 12 comprises a substantially rectangular plate 13 provided with a central orifice 14, also rectangular, and is intended to be fixed, for example by screwing, on the inside of the vertical wall 8 of the second stirrup 6. The plate 13 comprises a first piece 15a having the shape of a U, the arms 16, 17 of which are situated in a substantially horizontal plane and directly transversely towards the central girder 7, the ends 18 of the arms 16, 17 being rigidly fixed to the plate 13. There thus exists a space 19 formed between the arms 16, 17 of the first U-shaped piece 15a, the bottom 20 of the first U-shaped piece 15a and the plate 13. The first U-shaped piece 15a situated in the area of the front top corner of the plate 13, above the orifice 14.

The plate 13 also comprises a second U-shaped piece 15b with an identical overall shape and the same dimensions as the first U-shaped piece 15a, situated in the area of the front bottom corner of the plate 13, below the orifice 14, at a distance from the first U-shaped piece 15a. The two U-shaped pieces 15a, 15b are aligned vertically. Finally, reinforcement plates 21, 22, 23 are provided between the plate 13 and the two U-shaped pieces 15a, 15b.

Figure 4B:
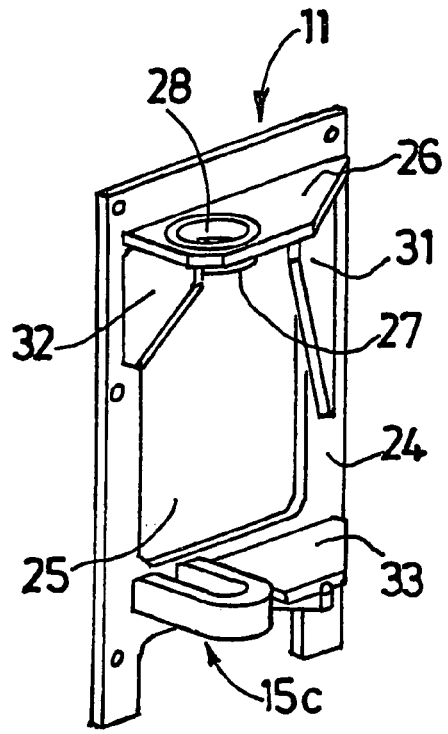

The intermediate piece 11 depicted in FIG. 4b comprises a substantially rectangular plate 24 provided with a central orifice 25, also rectangular, and is intended to be fixed, for example by screwing, to the inside of the vertical wall 8 of the first stirrup 5. The plate 24 first of all comprises a third U-shaped piece 15c with an identical overall shape and the same dimensions as the first U-shaped piece 15a, extending substantially horizontally and transversely towards the central girder 7. The third U-shaped piece 15c is rigidly fixed by its ends to the plate 11, in the area of the rear bottom corner, below the orifice 25. The plate 24 next comprises a horizontal wall 26 extending substantially horizontally and transversely towards the central beam 7, in the top area of the plate 24 above the orifice 25.

Figure 3:
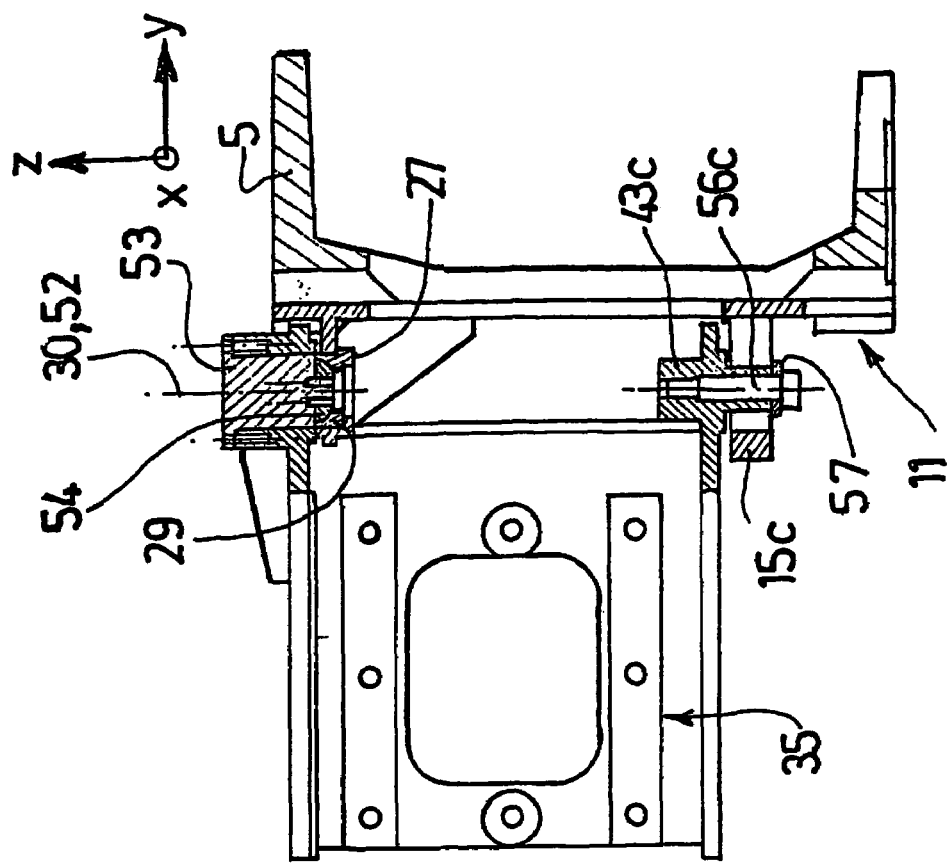
FIG. 3 is a view in section of the carriage in FIG. 2, along the line AA, the central girder not being depicted.
Figure 3:
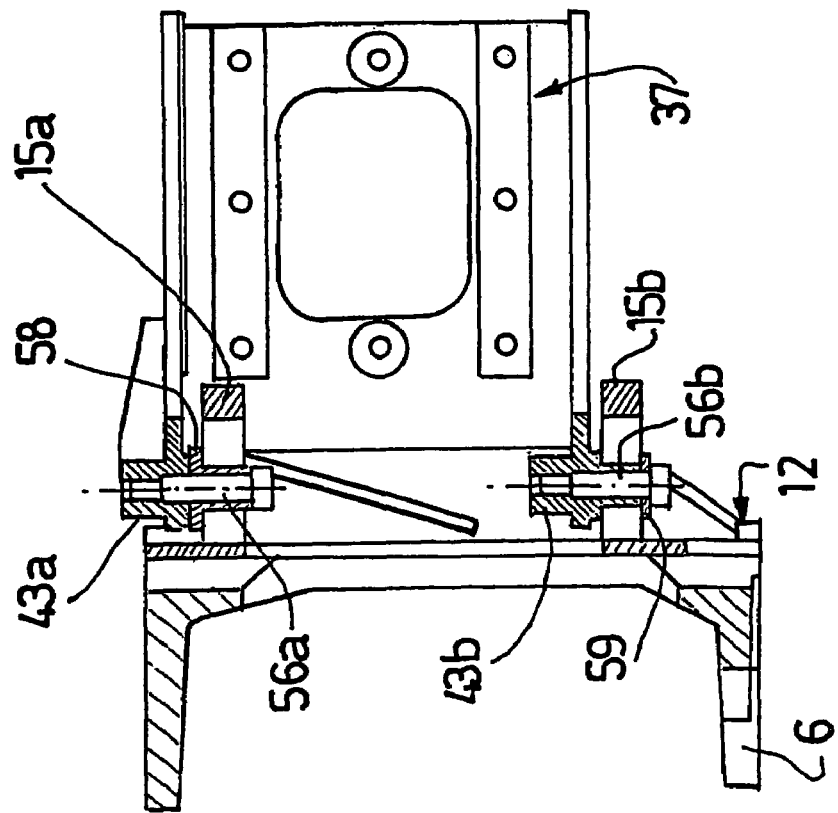

In the rear area of the plate 24, the horizontal wall 26 has a downward step 27, which forms partly the lateral wall and the bottom of a cavity emerging upwards through an orifice 28 in the shape of a disc. In the cavity there is placed a ring 29 of axis 30 and with an outside diameter substantially equal to the inside diameter of the cavity formed by the step 27. The ring 29 has a top internal face bevelled so as to form a concave housing, as illustrated in FIG. 3. The third U-shaped piece 15c is placed vertically in line with the orifice 28 in the horizontal wall 26, as will be explained later. Finally, reinforcement plates 31, 32, 33 are provided between the plate 24 and on the one hand the third U-shaped piece 15c and on the other hand the horizontal wall 26.

In addition, an intermediate piece is rigidly fixed to each of the lateral ends of the central beam 7, on the outside (towards the lateral girders 2, 3). The first end part 24 of the central girder 7—connected to the first stirrup 5—carries the intermediate piece 35 in FIG. 5b, and the second end part 36 of the central girder 7—connected to the second stirrup 6—carries the different intermediate piece 37, depicted in FIG. 5a.

Figure 5A:
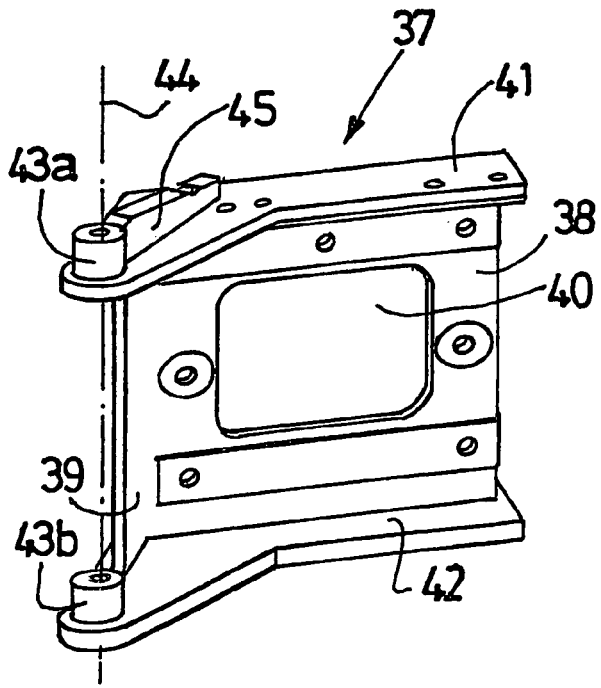
FIGS. 5a and 5b depict intermediate pieces intended to be rigidly fixed to the lateral ends of the central girder of the carriage.

The intermediate piece 37 depicted in FIG. 5a is described first of all. The intermediate piece 37 comprises a bent rectangular plate, the two parts 38, 39 of which, on each side of the bending zone, are situated in a vertical plane. The first part 38, provided with a substantially rectangular central orifice 40, is intended to be fixed, for example by screwing, to the second end part 36 of the central beam 7 and can be at least partially inserted in a cavity in the central girder 7 provided for this purpose. The second part 39 extends towards the second stirrup 6, and its width is smaller than the width of the first part 38, around one third. The angle between the two parts 38, 39 of the bent rectangular plate is for example between 110° and 160°.

The intermediate piece 37 also comprises a top horizontal wall 41 and a bottom horizontal wall 42, substantially identical, and having the shape of a flat V corresponding to the shape of the bent rectangular plate. The external end part of each of the horizontal walls 41, 42 comprises a hollow cylinder 43a, 43b extending from the horizontal wall 41, 42 upwards over a height of around 10% to 20% of the height of the bent rectangular plate. The two cylinders 43a, 43b are substantially identical and have the same vertical axis 44. In addition, a reinforcement 45 is provided between the external wall of the top cylinder 43a and the top horizontal wall 41.

Figure 5B:
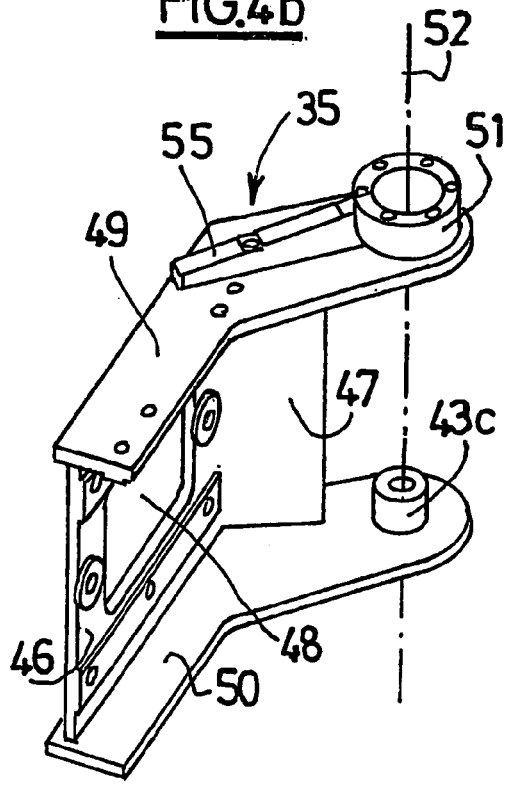

In a similar fashion, the intermediate piece 35 shown in FIG. 5b comprises a bent rectangular plate, the two parts 46, 47 of which are situated in a vertical plane and form an angle that can lie between 110° and 160°. It may be a case of a bent plate identical to that described with reference to FIG. 5a. The first part 46, provided with a substantially rectangular central orifice 48, is intended to be fixed to the first end part 34 of the central girder 7 and can be at least partially inserted in a cavity in the central girder 7 provided for this purpose. The second part 47, less wide, extends towards the first stirrup 5.

The intermediate piece 35 also comprises a top horizontal wall 39 and a bottom horizontal wall 50, substantially identical, and having the shape of a flat V corresponding to the shape of the bent rectangular plate. The external end part of the bottom horizontal wall 50 comprises a hollow cylinder 43c extending from the bottom horizontal wall 50 upwards over a height of around 10% to 20% of the height of the bent rectangular plate. In addition, the external end part of the top horizontal wall 49 comprises a hollow cylinder 51 extending from the top horizontal wall 49 upwards over a height of around 10% to 20% of the height of the bent rectangular plate. The hollow cylinder 50 has the same axis 52 as the hollow cylinder 43c but with inside and outside diameters greater than those of the hollow cylinder 43c.

A connecting piece is fixed to the inside of the hollow cylinder 51. This connecting piece comprises on the one hand a top part in the form of a solid cylinder 53, with a diameter substantially identical to the inside diameter of the hollow cylinder 51. The hollow cylinder 53 is provided with external top rims for fixing it—in particular by screwing—to the hollow cylinder 51. The bottom face of the solid cylinder 53 is situated substantially in the same horizontal plane as the bottom face of the hollow cylinder 51.

The connecting piece also comprises a part in the form of a spherical cap 54. The spherical cap 54 is fixed to the bottom face of the solid cylinder 53 so as to be coaxial with the solid cylinder 53 and so that the convex part of this spherical cap 54 is directed downwards. The dimensions of the spherical cap 54 are complementary to those of the ring 29, so that the cooperation of these two elements forms a swivel connection. According to one possible embodiment, the bottom portion of the spherical cap 54, situated inside the ring 29, is truncated (see FIG. 3). Finally, a reinforcement 55 is provided between the external wall of the hollow cylinder 51 and the top horizontal wall 49. The intermediate pieces 35, 37, rigidly fixed to the central beam 7 of the carriage 4, are intended to be associated with the intermediate pieces 11, 12 rigidly fixed to the stirrups 5, 6, thus forming connection means allowing the movement of the central girder 7 with respect to the stirrups and therefore also the movement of one stirrup with respect to the other (see FIG. 3).

Firstly, the association of the first stirrup 5 with the first end part 34 of the central girder 7 is described. Firstly, at the top part, the first stirrup 5 is associated with the end part 34 of the central girder 7 by means of a swivel connection formed at the intermediate pieces 11, 35 by cooperation between the spherical cap 54 and the bevelled ring 29, as indicated previously (the axes 30 and 52 substantially coinciding).

Secondly, at the bottom part, the first stirrup 5 is associated with the end part 34 of the central girder 7 by transverse sliding means. To this end, a rod 56c—for example a threaded rod provided with a nut at the bottom part—is inserted vertically upwards in the space 19 provided in the U-shaped piece 15c, and rigidly fixed to the inside of the hollow cylinder 43c. Axial locking means 57, such as a washer, are provided on the rod, under the U-shaped piece 15c and slightly recessed with respect to the U-shaped piece 15c, in order to allow the upward vertical movement of the intermediate piece 35 with respect to the intermediate piece 11 but to limit the amplitude of this movement. A vertical clearance is also provided between the bottom face of the hollow cylinder 43c and the top face of the U-shaped piece 15c. The diameter of this rod 56c is less than the distance between the branches of the U-shaped piece 15c and the distance between the bottom of the U-shaped piece 15c and the plate 24. Thus, by virtue of the longitudinal and transverse clearances, the rotation movement of the intermediate piece 35 with respect to the intermediate piece 11 is possible—but with limited amplitude—about the axes x and y. Naturally, the rotation movement about the axis z is possible by pivoting about the axis 30, 52.

Secondly the association of the second stirrup 6 with the second end part 36 of the central girder 7 is described. At the top part and at the bottom part, the second stirrup 6 is associated with the end part 36 of the central girder 7 by transverse sliding means, formed by the cooperation between the U-shaped pieces 15a, 15b on the one hand and the rods 56a, 56b on the other hand. A first rod 56a is inserted in the space 19 provided in the first U-shaped piece 15a and rigidly fixed to the inside of the hollow cylinder 43a. A washer 58 is interposed horizontally between the bottom face of the hollow cylinder 43a and the top face of the U-shaped piece 15a, thus forming a vertical abutment. A second rod 56b is inserted in the space 19 provided in the second U-shaped piece 15b and rigidly fixed to the inside of the hollow cylinder 43b. Axial locking means 59 are provided on the rod 56b under the U-shaped piece 15b and slightly recessed with respect to the U-shaped piece 15b, in order to allow the upward vertical movement of the intermediate piece 37 with respect to the intermediate piece 12 but to limit the amplitude of this movement.

A vertical clearance is also provided between the bottom face of the hollow cylinder 43b and the top face of the U-shaped piece 15b. The two rods 56a, 56b are substantially identical and with the same axis, their diameter being less than the distance between the arms of the U-shaped pieces 15a, 15b and the distance between the bottom of each U-shaped piece 15a, 15b and the plate 13. These longitudinal and transverse clearances allow the swivel movement about the axes x and y with limited amplitude.

Figure 6:
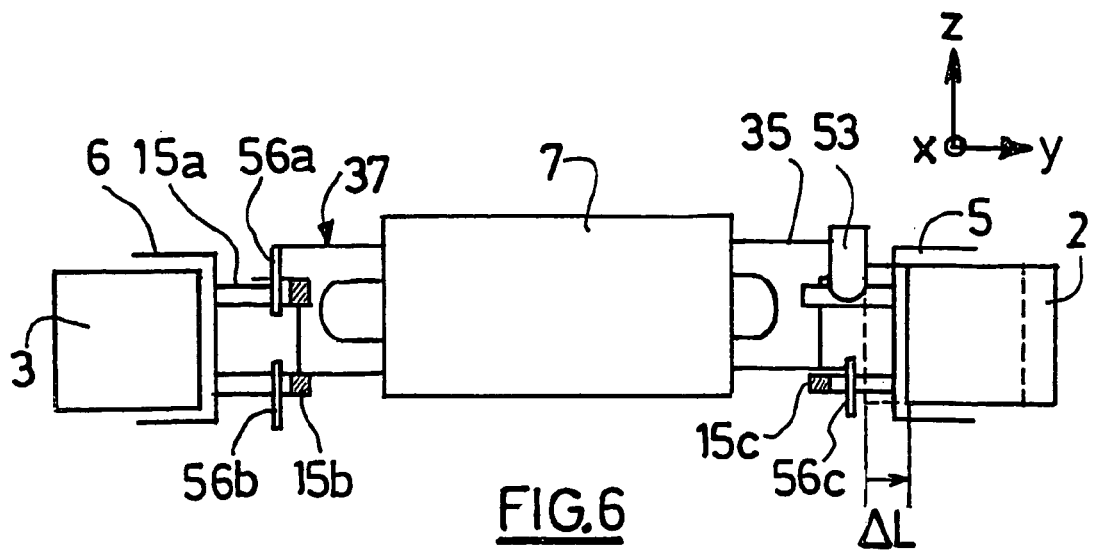
FIGS. 6 to 8 are schematic representations showing the deformations of the carriage when one stirrup is moved with respect to the other.
Figure 7:
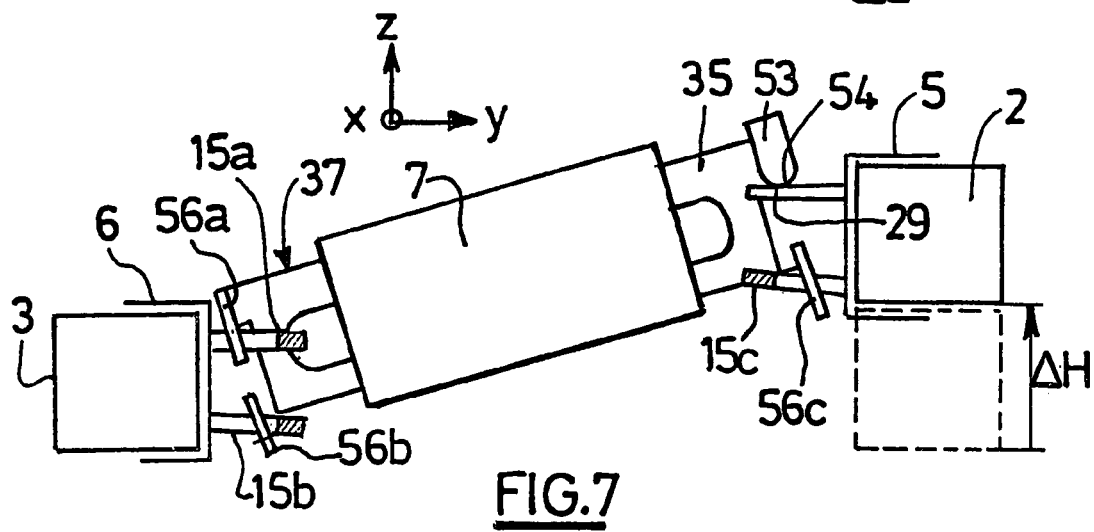
Figure 8:
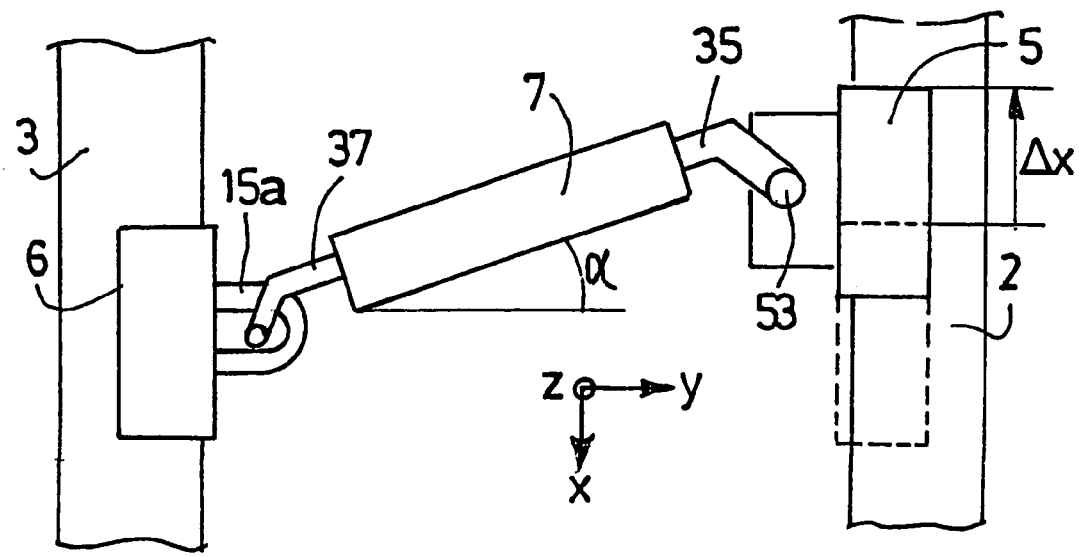

Reference is now made to FIGS. 6 to 8, which illustrate the possible deformations of the carriage following a movement of one stirrup with respect to the other, this movement being due for example to a deformation of the lateral girders 2, 3 or to any imperfect synchronisation of the motors driving the stirrups 5,6. The dotted lines illustrate the normal position of the first lateral girder 2 of the first stirrup 5, that is to say without deformation of the carriage 4.

FIG. 6 illustrates the case where the first lateral girder 2 is shifted horizontally from the second lateral girder 3 by an additional distance ΔL with respect to the normal. The rods 56a, 56b are then moved transversely in the spaces 19 provided in the U-shaped pieces 15a, 15b, towards the first lateral beam 2. This sliding aims to compensate for the distancing of the lateral girders 2, 3, allowing the increase in the distance between the second stirrup 6 and the second end part 36 of the central girder 7. A shift ΔL of around 10 mm can thus be accepted and compensated for without causing any problem of locking of the carriage or loss of precision.

FIG. 7 illustrates the case where the first lateral girder 2 is moved away vertically from the second lateral girder 3 by an additional distance ΔH with respect to the normal. The spherical cap 34 then pivots in the ring 29, about the axis x. This movement is possible by virtue of the existence of a vertical transverse clearance between the rods 56a, 56b, 56c and the U-shaped pieces 15a, 15b, 15c. The invention thus makes it possible to compensate for a shift ΔH of around ±4 mm/m.

Finally, FIG. 8 illustrates the case where the first stirrup 5 is shifted towards the rear by a distance Δx with respect to the second stirrup 6, in particular following faulty synchronisation of the motors separately driving the two stirrups 5, 6. The spherical cap 34 then pivots in the ring 29 about the axis z, just like the rod 56c in the space 19 provided in the U-shaped piece 15c. The rods 56a, 56b can also pivot in the space 19 provided in the U-shaped pieces 15a, 15b, about the axis z, but also move horizontally in the space 19 because of the existence of the longitudinal and transverse clearances. The central girder 7 can thus be inclined, in the horizontal plane, and with respect to the direction y, by an angle α of around 5°.

In summary, the swivel connection therefore makes it possible to accept rotation movements in all directions, these movements being possible but limited by the existence of the longitudinal, transverse and vertical clearances between the rods 56a, 56b, 56c and the U-shaped pieces 15a, 15b, 15c. In addition, transverse sliding is also provided. Naturally, these elementary movements can be combined with each other and vary during the movement of the carriage along the lateral girders 2, 3, the total resulting movement being compensated for by the appropriate cooperation by the various connection means provided on the carriage 4. The invention makes it possible to meet the requirements with regards to precision and robustness of such gantries. By way of example, the carriage can be moved at a speed of 3 m/s and must be stopped over a distance of 20 cm, a precision of around a millimetre generally being demanded.

The invention claimed is:

1. A carriage intended to be placed substantially transversely between first and second lateral girders substantially parallel to each other, the carriage comprising:
   a stirrup at each of its lateral end parts, a first stirrup being able to cooperate with the first lateral girder and a second stirrup being able to cooperate with the second lateral girder so as to allow movement of the carriage in a longitudinal direction (x) substantially parallel to the lateral girders;
   a central girder placed between the stirrups; and
   a first connection arranged between a first lateral end of the central girder and the first stirrup, the first connection comprising a swivel connection and a first transverse slide situated at a distance from the swivel connection, and a second connection arranged between a second lateral end of the central girder and the second stirrup, the second connection comprising a vertical support and a second transverse slide, the support and the second transverse slide being arranged so as to allow a rotation movement of the central girder with respect to the first stirrup around longitudinal (x), transverse (y) and vertical (z) axes with limited amplitude, the connections being arranged to allow the movement of one stirrup with respect to the other, according to six degrees of freedom, with limited amplitude.

2. A carriage according to claim 1, wherein the first transverse slide includes means for limiting the amplitude of the rotation of the central girder with respect to the first stirrup about longitudinal, transverse and vertical axes.

3. A carriage according to claim 1, wherein at least one of the transverse slides comprises:
   on the one hand a piece having a U shape, the arms of which are situated in a substantially horizontal plane and directed transversely towards the central girder, the ends of the arms being fixed rigidly to a stirrup of the carriage; and
   on the other hand a rod fixed rigidly to the central girder and extending orthogonally to the U-shaped piece, the rod being arranged so as to be inserted in the space formed between the arms of the U-shaped piece with clearance so as to allow the transverse sliding of the central girder with respect to the end part of the carriage and to allow the rotation of the central girder with respect to the first stirrup about longitudinal, transverse and vertical axes according to a certain amplitude, by virtue of the swivel connection.

4. A carriage according to claim 3, wherein the second stirrup comprises two U-shaped pieces aligned vertically and situated at a distance from each other and the central girder is provided with two aligned vertical rods arranged so as to each to be inserted in one of the U-shaped pieces.

5. A carriage according to claim 1, wherein the first stirrup comprises a concave housing, and a convex piece of complementary shape to that of the housing is rigidly fixed to the central girder so as to be able to cooperate with the housing in order to form the swivel connection.

6. A carriage according to claim 5, wherein the first stirrup comprises on the one hand a concave housing having a substantially vertical axis and on the other hand a U-shaped piece, and the central girder is provided with a vertical rod arranged so as to be inserted in the U-shaped piece so as to be placed so as to be substantially aligned with the axis of the concave housing.

7. A carriage according to claim 1, further comprising a first intermediate piece rigidly fixed to each of the two stirrups, and a second intermediate piece rigidly fixed to each of the lateral ends of the central girder, the connections between the central girder and the stirrups being carried by the intermediate pieces.

8. A carriage intended to be placed substantially transversely between first and second lateral girders substantially parallel to each other, the carriage comprising:
   a substantially U-shaped stirrup member;
   at least first and second intermediate members;
   a slotted structure, having an elongated slot, projecting from one of the members;
   an insertion structure, having a portion movably riding within the slot, coupled to another of the members; and
   a connection movably coupling the one of the members to the another of the members while allowing three dimension movement therebetween, the connection being spaced away from the slotted structure and the insertion structure.

9. A carriage according to claim 8, wherein the connection includes a pin engaging an oversized slot.

10. A carriage according to claim 8, wherein the connection includes a swivel.

11. A carriage according to claim 8, further comprising a central, movable girder, wherein one of the members includes a first central surface and an attached second central surface angularly offset from the first central surface, the first surface being directly attached to the insertion structure which is an elongated pin, and the second central surface being inserted within the central girder.

12. A carriage intended to be placed substantially transversely between first and second lateral girders substantially parallel to each other, the carriage comprising:
   a third girder extending in a substantially horizontal direction substantially perpendicular to the first girder, the third girder being movable relative to the first girder; and
   a member being able to couple the third girder to the first girder, the member operably moving with the third girder, the member comprising at least one pin-and-oversized slot assembly which allows three dimensional misalignment of the first girder relative to the third girder while allowing longitudinal movement of the third girder relative to the first girder wherein the pin-and-oversized slot assembly comprises:
      a U-shaped, slotted structure situated in a substantially horizontal plane and being elongated transversely toward the third girder; and
      a pin coupled to the third girder and extending substantially perpendicular relative to an elongation direction of the slotted structure, the pin being movably located in a slot of the structure with clearance so as to allow transverse sliding of the third girder with respect to the first girder and to allow rotation of the third girder with respect to the first girder.

13. A carriage according to claim 12, further comprising a stirrup coupled to and movable with the member, wherein the member further comprises a swivel connection, and the pin-and-slot assembly includes a vertical support and a transverse slide, the support and the transverse slide are arranged so as to allow the rotation movement of the third girder with respect to the stirrup around longitudinal (x), transverse (y) and vertical (z) axes with limited amplitude.

14. A carriage according to claim 13, wherein the transverse slide includes means for limiting the amplitude of the rotation of the third girder with respect to the stirrup about longitudinal, transverse and vertical axes.

15. A carriage according to claim 12, further comprising a second member able to movably couple the third girder to the second girder and allow three dimensional misalignment of the second and third girders while allowing longitudinal movement of the third girder relative to the first girder.

16. A carriage according to claim 12, wherein the member further comprises a concave housing and a convex piece of complementary shape to that of the housing, and one of the housing and convex piece being rigidly fixed to the third girder so as to define a swivel connection.

17. A carriage intended to be placed substantially transversely between first and second lateral girders substantially parallel to each other, the carriage comprising:
   a stirrup at each of its lateral end parts, a first stirrup being able to cooperate with the first lateral girder and a second stirrup being able to cooperate with the second lateral girder so as to allow movement of the carriage in a longitudinal direction (x) substantially parallel to the lateral girders;
   a central girder placed between the stirrups; and
   a first connection comprising a swivel connection and arranged between a first lateral end of the central girder and the first stirrup, and a second connection comprising a vertical support and a transverse slide that are arranged to allow a rotation movement of the central girder with respect to the first stirrup around longitudinal (x), transverse (y) and vertical (z) axes with limited amplitude, the second connection arranged between a second lateral end of the central girder and the second stirrup, the connections being arranged to allow the movement of one stirrup with respect to the other, according to six degrees of freedom, with limited amplitude, wherein the first stirrup comprises on the one hand a concave housing having a substantially vertical axis and on the other hand a U-shaped piece of complementary shape to the housing that is rigidly fixed to the central girder so as to be able to cooperate with the housing in order to form the swivel connection, and the central girder is provided with a vertical rod arranged so as to be inserted in the U-shaped piece so as to be placed so as to be substantially aligned with the axis of the concave housing.

18. The carriage according to claim 17, wherein the transverse slide includes means for limiting the amplitude of the rotation of the central girder with respect to the first stirrup about longitudinal, transverse and vertical axes.

19. The carriage according to claim 17, wherein the first connection also comprises a transverse slide situated at a distance from the swivel connection, the transverse slide of the second connection being arranged so as to allow the rotation movement of the central girder with respect to the first stirrup about longitudinal, transverse and vertical axes with limited amplitude.

20. A carriage intended to be placed substantially transversely between first and second lateral girders substantially parallel to each other, the carriage comprising:

a third girder extending in a substantially horizontal direction substantially perpendicular to the first girder, the third girder being movable relative to the first girder; and a member being able to couple the third girder to the first girder, the member operably moving with the third girder, the member comprising at least one pin-and-oversized slot assembly which allows three dimensional misalignment of the first girder relative to the third girder while allowing longitudinal movement of the third girder relative to the first girder, wherein the member further comprises a concave housing and a concave housing and a convex piece of complementary shape to that of the housing, and one of the housing and convex piece being rigidly fixed to the third girder so as to define a swivel connection.

21. A carriage according to claim 20, further comprising a stirrup coupled to and movable with the member, wherein the member further comprises a swivel connection, and the pin-and-slot assembly includes a vertical support and a transverse slide, the support and the transverse slide are arranged so as to allow the rotation movement of the third girder with respect to the stirrup around longitudinal (x), transverse (y) and vertical (z) axes with limited amplitude.

22. A carriage according to claim 21, wherein the transverse slide includes means for limiting the amplitude of the rotation of the third girder with respect to the stirrup about longitudinal, transverse and vertical axes.

23. A carriage according to claim 20, further comprising a second member able to movably couple the third girder to the second girder and allow three dimensional misalignment of the second and third girders while allowing longitudinal movement of the third girder relative to the first girder.

24. A carriage according to claim 20, wherein the pin-and-slot assembly comprises:

a U-shaped, slotted structure situated in a substantially horizontal plane and being elongated transversely toward the third girder, and a pin coupled to the third girder and extending substantially perpendicular relative to an elongation direction of the slotted structure, the pin being movably located in a slot of the structure with clearance so as to allow transverse sliding of the third girder with respect to the first girder and to allow rotation of the third girder with respect to the first girder.

* * * * *